United States Patent
Wadden et al.

(10) Patent No.: US 11,263,598 B2
(45) Date of Patent: Mar. 1, 2022

(54) AUTOMATED REPOSITORY FOR RECYCLABLE CONTAINERS AND METHOD FOR UNMANNED OPERATION THEREOF

(71) Applicants: Ever Green Environmental Corporation, St. John's (CA); Yellow Environmental Inc., St. John's (CA)

(72) Inventors: Michael Wadden, St. John's (CA); Jonathan Drover, St. John's (CA); Vinayak Bhat, St. John's (CA)

(73) Assignee: Yellow Environmental Inc., St. Johns (CA)

( * ) Notice: Subject to any disclaimer, the term of this patent is extended or adjusted under 35 U.S.C. 154(b) by 992 days.

(21) Appl. No.: 15/631,521

(22) Filed: Jun. 23, 2017

(65) Prior Publication Data

US 2017/0372272 A1 Dec. 28, 2017

Related U.S. Application Data

(60) Provisional application No. 62/354,334, filed on Jun. 24, 2016.

(51) Int. Cl.
*G06Q 10/00* (2012.01)
*B65F 1/10* (2006.01)
(Continued)

(52) U.S. Cl.
CPC .............. *G06Q 10/30* (2013.01); *B65F 1/00* (2013.01); *B65F 1/006* (2013.01); *B65F 1/10* (2013.01); *G07C 9/00182* (2013.01); *B65F 2210/128* (2013.01); *B65F 2210/138* (2013.01); *B65F 2210/148* (2013.01); *B65F 2210/172* (2013.01); *Y02W 90/00* (2015.05)

(58) Field of Classification Search
None
See application file for complete search history.

(56) References Cited

U.S. PATENT DOCUMENTS 10,614,475 B2 * 4/2020 Frybarger .......... G06Q 30/0207
2007/0276686 A1 * 11/2007 Hunscher ............... G06Q 20/34
705/39

(Continued)

FOREIGN PATENT DOCUMENTS

GB 2531604 A * 4/2016 ............... B03B 9/00

OTHER PUBLICATIONS

United States Environmental Protection Agency, "Waste Transfer Stations: A Manual for Decision-Making," Jun. 2002, available online at https://www.epa.gov/sites/default/files/2016-03/documents/r02002.pdf (Year: 2002).*

Primary Examiner — Jan P Mincarelli
(74) Attorney, Agent, or Firm — Pearne & Gordon LLP

(57) ABSTRACT

A system for depositing of recyclable articles includes an internally-compartmented structure. The compartments are accessed through hatches which are selectively closed with covers. The system includes a user-operated kiosk which controls operation of the covers in response to user information and the degree to which the compartments are filled with recyclable articles. The kiosk includes a display for directing the user to deposit the articles into specific compartments and a user interface for entry and display of user-specific information.

20 Claims, 9 Drawing Sheets

(51) Int. Cl.
*B65F 1/00* (2006.01)
*G07C 9/00* (2020.01)

(56) References Cited

U.S. PATENT DOCUMENTS

| | | | |
|---|---|---|---|
| 2008/0190953 A1* | 8/2008 | Mallett | G07F 11/62 |
| | | | 221/13 |
| 2011/0225098 A1* | 9/2011 | Wolff | G06Q 30/02 |
| | | | 705/308 |
| 2012/0010746 A1* | 1/2012 | Sundholm | G06Q 10/30 |
| | | | 700/226 |
| 2013/0075468 A1 | 3/2013 | Wadden et al. | |

* cited by examiner

AUTOMATED REPOSITORY FOR RECYCLABLE CONTAINERS AND METHOD FOR UNMANNED OPERATION THEREOF

FIELD

The present invention generally relates to handling of recyclable materials received from consumers. More specifically, it relates to a repository for receiving materials from a consumer at a location remote from a processing facility and a method for operating that system.

BACKGROUND

Recyclable materials such as containers, cans and bottles, are generally brought to a designated recycling premise by a consumer for return and the refunding of any deposits. Conventionally, this may consist of a business such a grocery or beverage store, where the containers are manually counted and sorted, and a refund paid to the consumer. The sorted containers are normally stored on-site until they are transported to a recycling facility. This arrangement is time consuming, costly and inefficient. Inconvenience to the customer can reduce customer take-up and inefficiencies can drive up costs.

Automated systems have been proposed to address some of these drawbacks. Such systems can provide unmanned receptacles to receive containers and store them in a location remote from the sorting and counting location. In order for such a system to work with deposit-bearing containers, it is useful to provide a means to provide value to the customers for containers deposited with the system. For example, the present inventors have developed such a system, as disclosed in U.S. application Ser. No. 13/685,191, filed Nov. 26, 2012.

SUMMARY

It is an object to provide an improved repository for recyclable material that can operate without a human attendant and a method of operating such a system.

We disclose herein a system for depositing of recyclable articles comprising:

a) a structure configure to house storage compartments that are configured to temporarily store the recyclable articles. The structure includes multiple hatches open to the exterior of the structure to permit articles to be deposited into individual ones of the compartments. The hatches are independently closed by covers. The covers are actuated by actuators that are configured to independently close, lock and unlock the covers by remote actuation. The actuators may also be adapted to independently open and close the covers by remote actuation in response to electronic signals. The locking and unlocking functions are performed by hatch locking means that retain the covers in a closed position in which unauthorized user access is blocked and which released the covers from the closed position when actuated to do so. The locking functions may be provided by a separate locking mechanism or a cover opening/closing actuator that resists forcible opening when in the closed position. The terms "lock" and "locking means" are used broadly herein to refer to means of either type including any type of mechanism to retain the cover in a closed position and to release the cover in response to an actuation signal;

b) a user interface for receiving input from a user and displaying information, wherein the user-generated input includes user identification information and the quantity of articles or bundles of articles which the user intends to deposit and the displayed information includes a selected one or ones of the compartments into which the user can deposit the articles; and c) a controller in electronic communication with the user interface and the hatch actuators, wherein the controller is configured to determine which compartment has capacity to receive articles from the user and to control the hatch locking means associated with that compartment for opening and closing of the hatch cover associated with that compartment.

The actuators may comprise remotely actuated locks that permit manual opening of the covers on a selected individual basis, in which the locks are remotely controlled by the controller, and/or an actuator that automatically opens and closes the covers in response to signals from the controller.

The controller may be configured to determine selected one or ones of the compartments to receive the articles that are being deposited by the user based on the capacity of the compartments to receive the articles from the user, wherein said determination provides the least number of compartments required to receive the articles without exceeding the capacity status of any compartment. The capacity status may be determined by physically detecting articles deposited by previous users, for example by electronic detectors installed in or near the hatches or compartments, or by information entered by previous users at the interface that provides the numbers of articles or article bundles that have been deposited by previous users, or a combination of these two.

We further disclose a system for recyclable articles, comprising at least one repository as described herein and a central processor in electronic communication with the repository(ies). The central processor may centrally control said repositories and/or centrally monitor the capacity status of individual compartments to trigger a pickup of articles from the repositories when a predetermined capacity has been reached.

We further disclose a kiosk for controlling a system for depositing of recyclable articles of the type described herein. The kiosk comprises a) a user interface for receiving input from a user and displaying information to the user, wherein the user input includes user identification information and the quantity of articles or bundles of articles which the user intends to deposit, and the displayed information includes identification of a selected one or ones of the compartments into which the user can deposit the articles; and b) a controller in electronic communication with the user interface and the actuators, wherein the controller is configured to determine the capacity status of said compartments, to determine which compartment has capacity to receive articles from the user based on said capacity status, and to control selected ones of the actuators associated with corresponding ones of the compartments for opening and closing of the hatch covers associated with the selected ones of the compartments.

We further disclose a method of collecting articles at an unmanned repository comprising a structure having multiple internal compartments each of which is independently accessible by a corresponding openable hatch. The method comprises the steps of: identifying a user; receiving information indicating the number of article-filled bundles that the user proposes to deposit; generating at least one label for each of the bags to be deposited, wherein the label uniquely identifies the user and the bundles; determining a hatch into which one or more of the bundles are to be deposited; opening the hatch for receiving the bags from the user; and closing the hatches after a predetermined period. The hatches may be closed after a variable duration that depends on the number of bundles to be deposited by a given user.

It will be understood that although the invention is presently exemplified by a system for handling used recyclable containers, it may be adapted for receiving and storing a wide variety of articles from users that can be safely deposited into and stored within the repositories.

The present invention will now be further illustrated by a non-limiting embodiment thereof.

DETAILED DESCRIPTION

Figure 1:
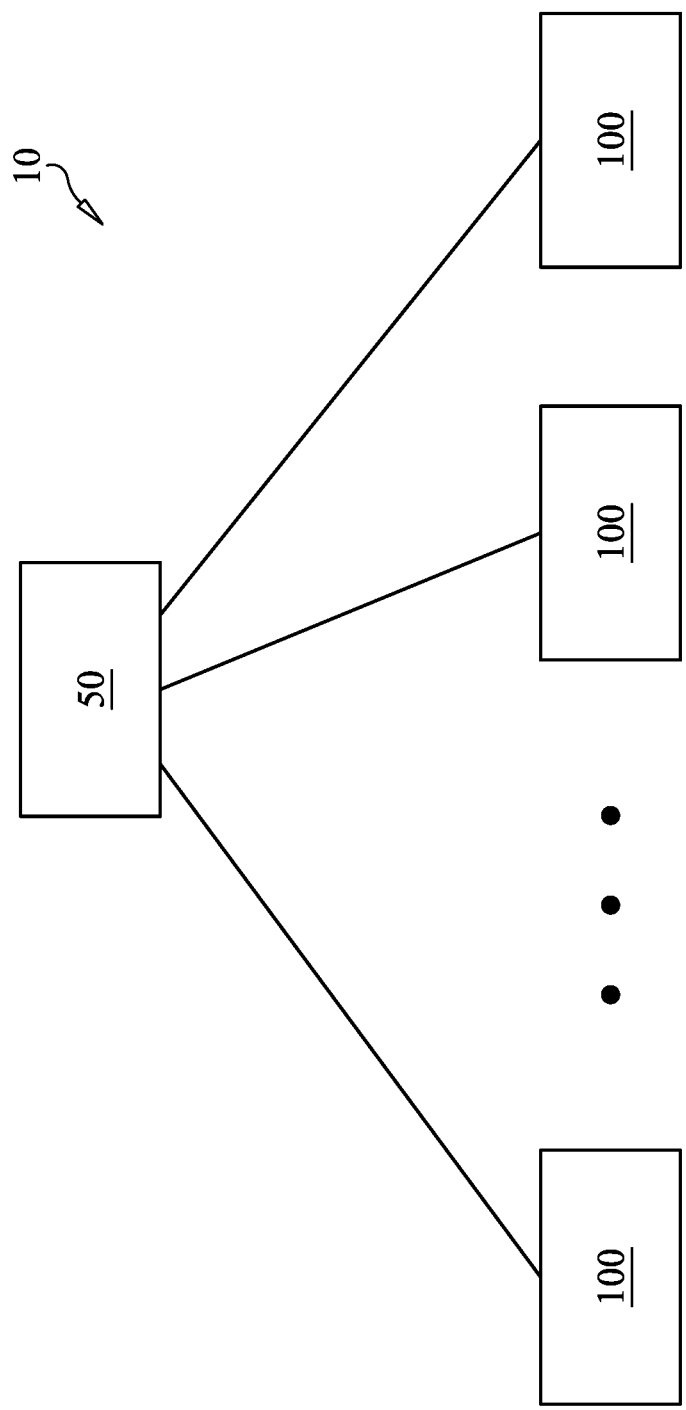
FIG. 1 is a block diagram showing a system for automatically depositing the recycling materials according to an embodiment of the invention
Figure 2:
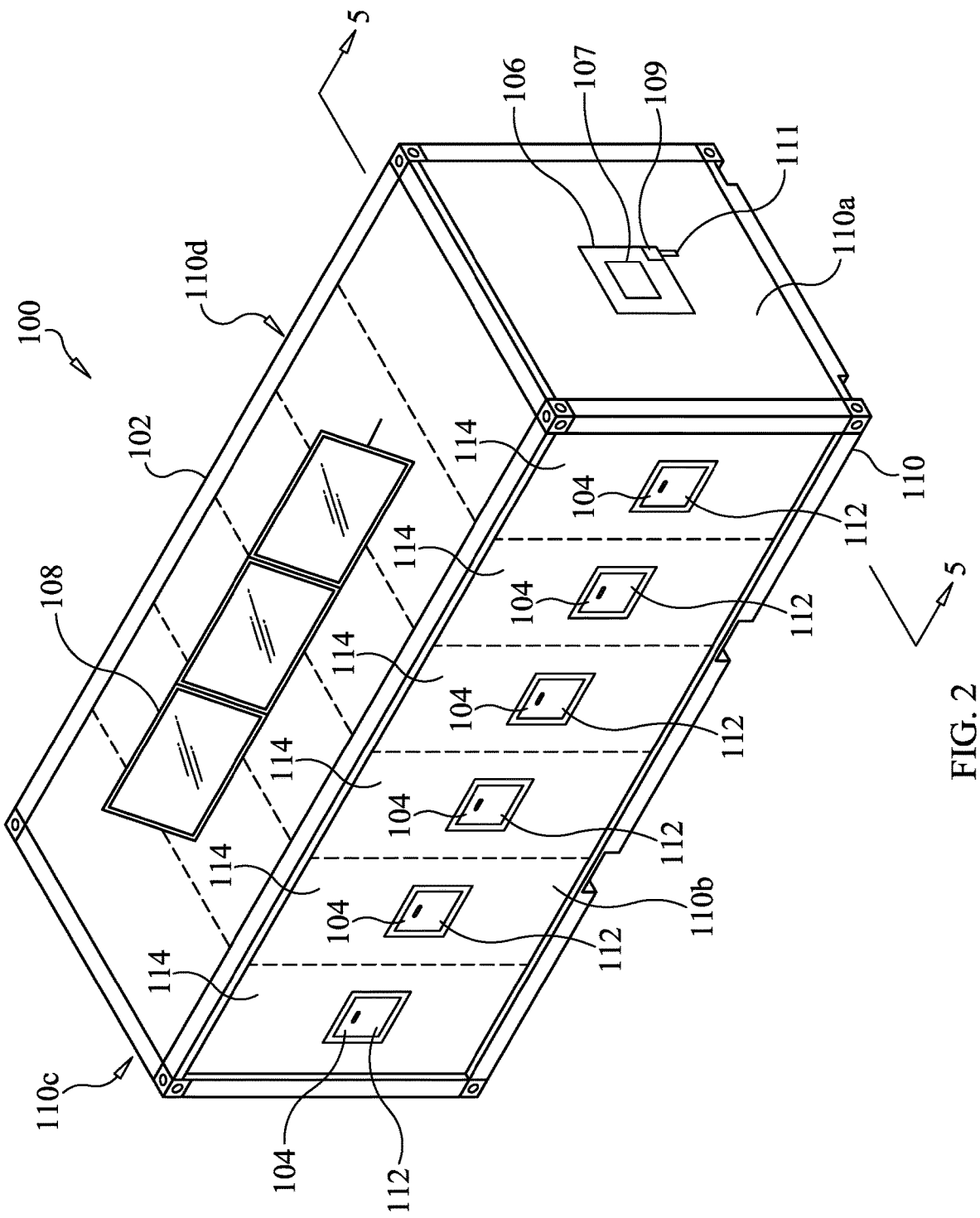
FIG. 2 is a schematic view showing a repository for automatically depositing the recycling materials.
Figure 3:
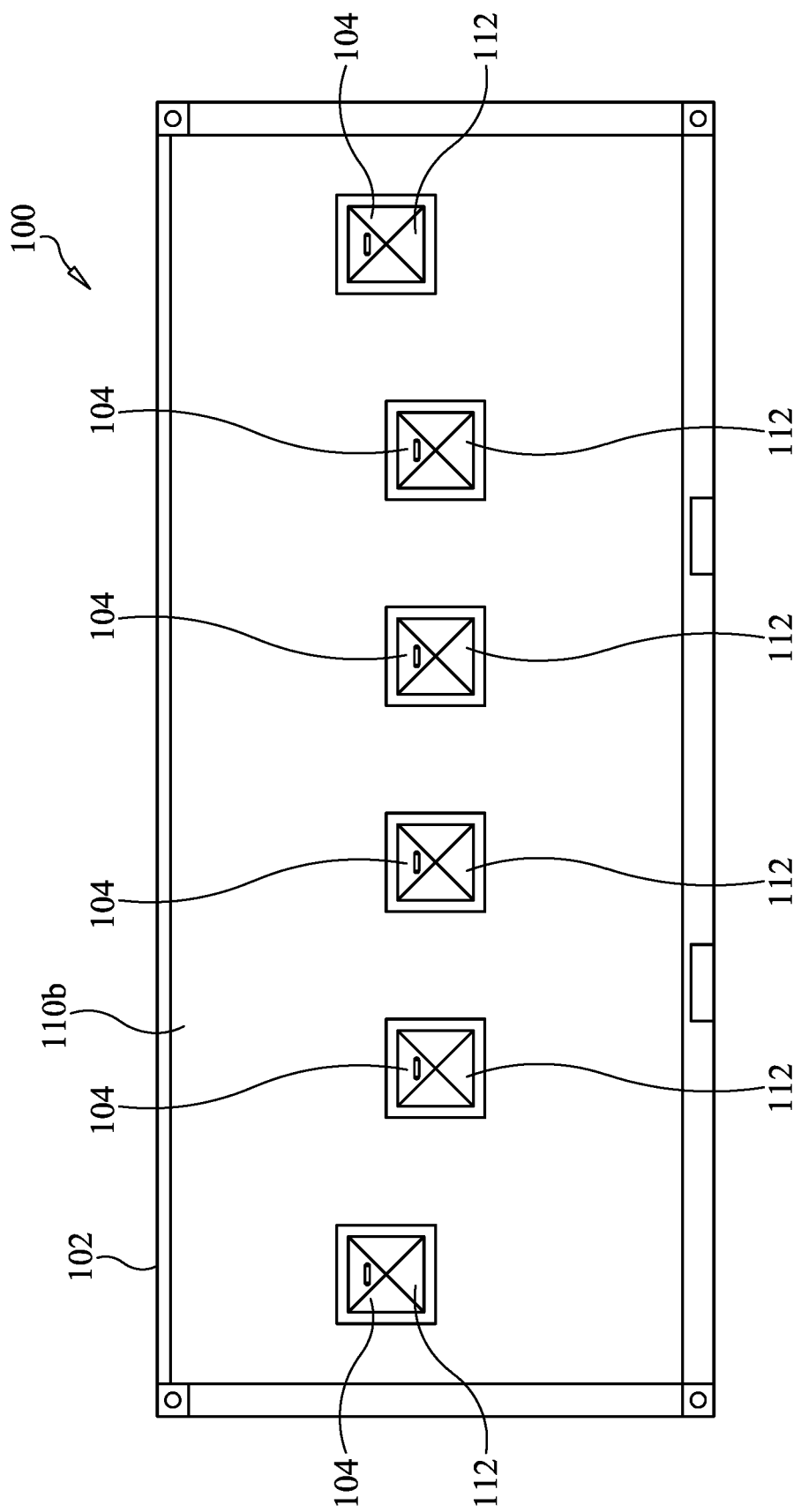
FIG. 3 a side elevational view of the repository of FIG. 2.
Figure 4:
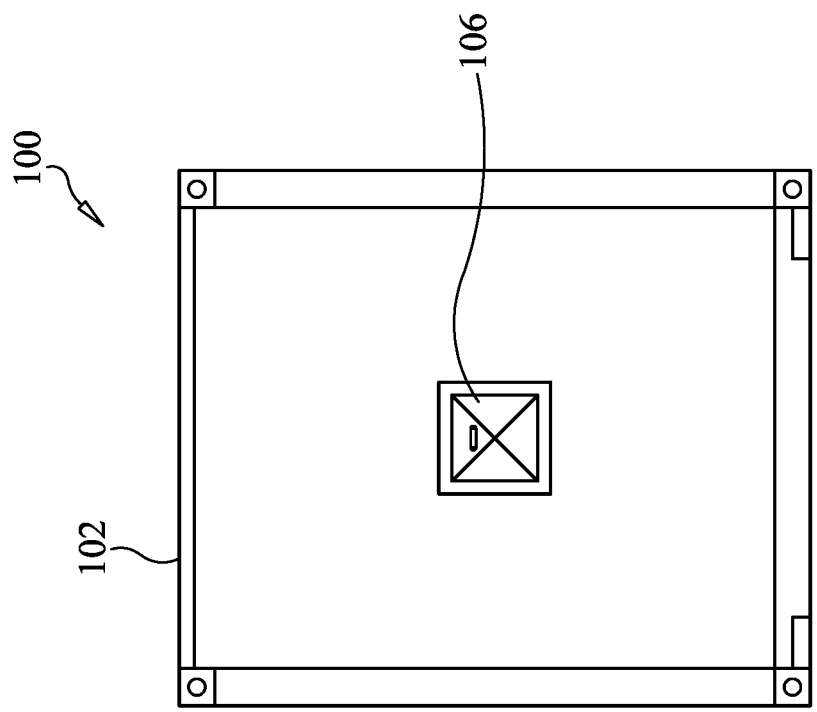
FIG. 4 is an end elevational view of the repository of FIG. 2.
Figure 5:
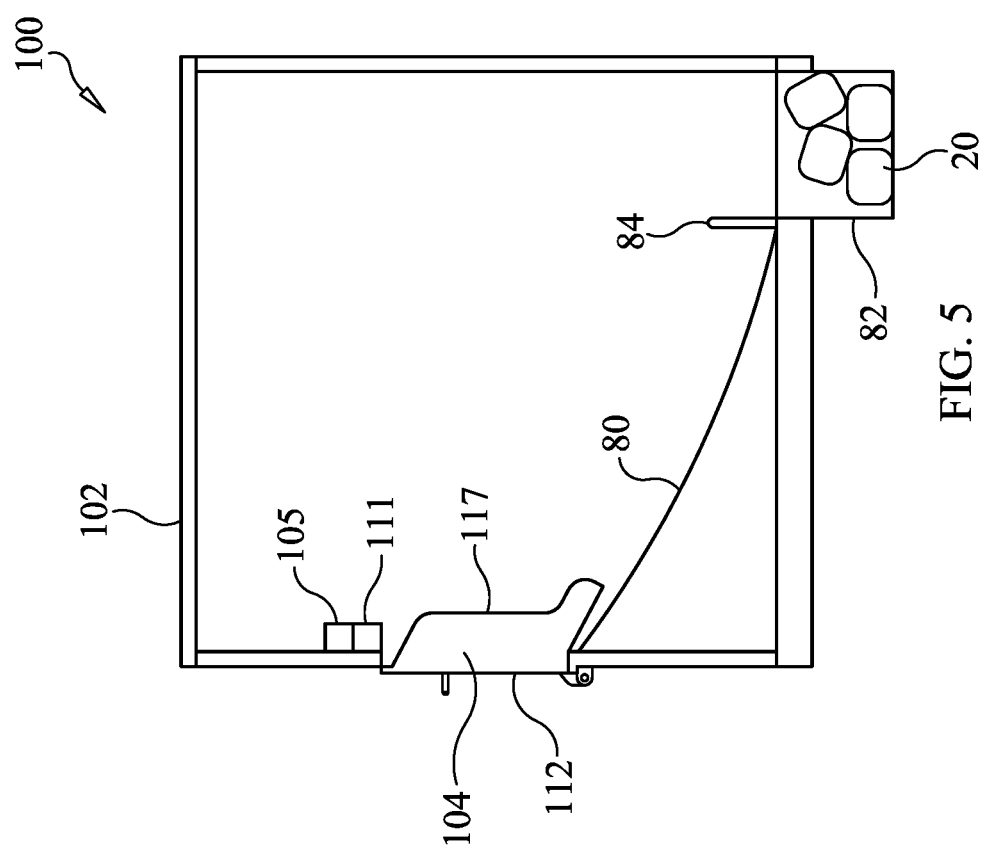
FIG. 5 is a cross-sectional view of the repository along line 5-5 of FIG. 2, showing a hatch cover in a closed position.

Referring to FIG. 1, a system 10 according to an embodiment of the invention comprises one or more repositories 100 and a central information processor 50, such as a server, that is in communication with repositories 100. Repositories 100 are configured to receive and store recyclable articles that are deposited by users, such as beverage containers. The articles are normally bundled together in bundles, such as bags 20 (see FIGS. 5 and 6). Individual repositories 100 can be located at locations that are convenient for customer use, such as mall or supermarket parking lots. In one example, multiple repositories 100 are provided over a geographically widespread area and are all in communication with central processor 50 over a network such an Internet link. Processor 50 can, for example, be located at a manned recycling facility where articles received at repositories 100 are sorted, processed etc. Alternatively, processor 50 is remote from the processing facility but in communication therewith.

Turning to FIGS. 2 to 6, an individual repository 100 comprises a structure 102 for receiving and storing articles that are deposited by users 12 such as bottles, cans, etc., and a user-operated kiosk 106. Kiosk 106 may be integrated into structure 102 or physically separate. Structure 102 is fully enclosed and, when fabricated for outdoor use, is substantially impervious to the elements. Since structure 102 houses potentially valuable deposit-bearing articles that are deposited by customers, it should resist unauthorized opening and tampering. Structure 102 has four sidewalls 110a through 110d, a flat roof and a floor. For example, structure 102 may be a re-purposed shipping container or a purpose-built structure having a similar configuration as a shipping container. At least two sidewalls 110a and 110b are accessible to a user. Kiosk 106 may be built into or secured to first sidewall 110a, which forms an end wall of structure 110. One of sidewalls 110a-d, preferably rear sidewall 110d, is openable or has an openable panel to allow access into the interior for replacing article-containing bins housed within structure 102, as described below. A lock secures the openable sidewall to prevent unauthorized access into the structure.

A front-facing sidewall 110b has plurality of hatches 104 therein, which are of a configuration and location to allow a user to insert bags 20 containing recyclable materials through the hatch into the interior of structure 102. As described below, such materials are normally bundled by the consumer into relatively large bags such as a conventional curbside garbage bag, a kitchen garbage bag or the like, whereby hatch 104 is dimensioned to allow a user to easily insert such a bag. The number of hatches 104 can vary depending on the size of structure 102 and other considerations. In the present example, container 102 has six hatches 104.

Hatches 104 are each independently covered with a corresponding openable hatch cover such as a flap 112 (seen in more detail in FIGS. 5 and 6), which provides a weathertight seal when closed with container 102. Flaps 112 open to allow a user 12 access to insert bags 20 into the corresponding hatches 104 and close to seal structure 102 from the elements and intrusion. A flap actuator 111 closes flaps 112 in response to signals from remote processor 50 and/or from kiosk 106. Actuator 111 also secures flaps 112 into the closed position to prevent unauthorized access into structure 102. Hatch covers 112 are each independently locked with locks 105, for example with a "fail secure" lock, which is controlled by processor 50 and/or kiosk 106 for automatic, remotely-controlled operation. When kiosk 106 directs the customer to a specific hatch 104, controller 50 or kiosk 106 sends a signal to unlock the corresponding lock 105. After a given hatch 104 is unlocked, flap 112 may then be opened automatically or manually. That is, a consumer may physically open the corresponding flap 112 or it may be opened by actuation from the corresponding actuator 111 associated with that flap.

Actuator 111 comprises a chain drive that pays out chain 119 to allow flap 112 to open in response to retraction by the user, and which then retracts chain 119 to close flap 112 after a selected duration. Actuator 111 may be motor driven or spring-loaded.

Flaps 112 are fabricated to resist tampering and unauthorized access. For example, flaps 112 comprise a generally L-shaped steel plate 113 hinged to structure 102 with hinges that are not removable from the exterior of structure 102. Flaps 112 have a trough-like shape that includes sidewalls 117 configured to channel articles into hatch 104. A chain 119 connects flap 112 to the sidewall 110b of container 102 to provide a limit stop of the rotation of flap 112 when opened, for example whereby a portion of plate 113 is held in a generally horizontal position when fully open to receive bags 20. When closed, a portion of plate 113 forms a downwardly-angled chute that allows bags 20 to slide by gravity into a corresponding bin 82 that is aligned with the selected hatch 104.

Figure 7:
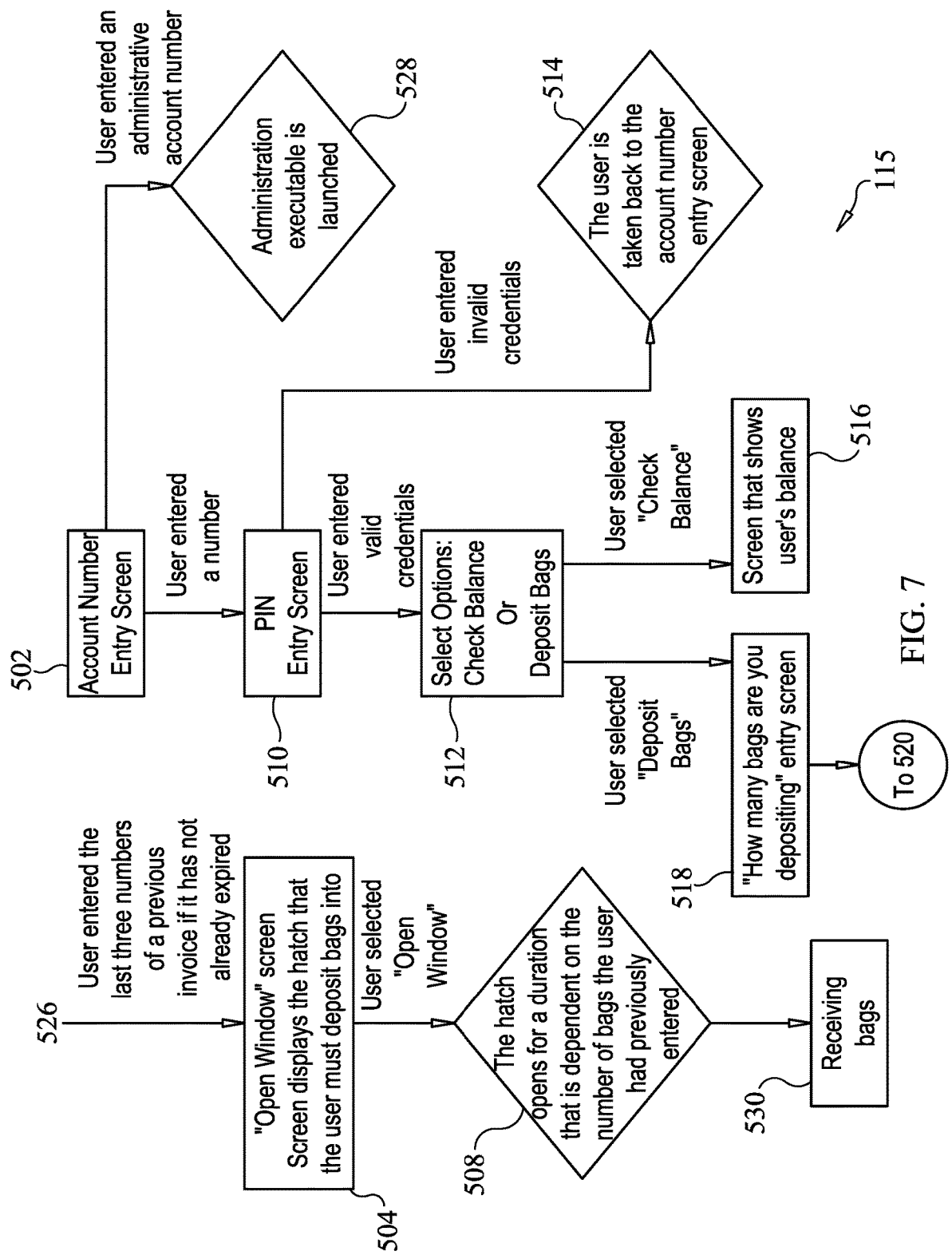
FIG. 7 is a block diagram showing a process of depositing bags with the present system.

As seen in FIG. 7, the interior of structure 102 is provided with multiple compartments 114, which may comprise or house independently removable bins 82. Compartments 114 may include internal walls within structure 102 or instead be defined by regions within structure 102 that are not separated by physical barriers, and within which bins 82 are positioned in alignment with corresponding hatches 104. Compartments 114 are spaced such that each hatch 104 directly leads to a specific compartment whereby articles, which are normally placed within bags 20 by the user beforehand, are inserted into a given hatch 104 and then drop or slide into a corresponding compartment 114. For example, a repository 100 having six compartments 114 would be provided with six corresponding hatches 104. In that fashion, material inserted into a given hatch 104 falls into a corresponding compartment 114.

Each compartment 114 includes a slide 80 that guides bags 20 downwardly into a removable bin 82. A transverse rail 84 spans each compartment 114 above the lowermost end of slide 80. Rail 84 assists in guiding bags 20 into a corresponding bin 82. As well, rail 84 serves as a backstop to position bin 82 in correction position within compartment 114 when bin 82 is inserted into compartment 114 by an operator.

Kiosk 106 permits a user to interact with repository 100 in a manner that directs the user to deposit containers within a specific, selected compartment 114. Kiosk 106 is weatherproof and/or enclosed in a weatherproof enclosure, and/or may be located under a roof. A typical user of system 10 who interacts with kiosk 106 is a consumer who wishes to deposit containers or alternatively an authorized operator who requires access to repository 100. Kiosk 106 is either mounted on a sidewall 110 of container 102, such as end wall 110a, or is physically separate from the container 102. In either case, kiosk 106 communicates electronically with flap actuators 111 or the locks of the flaps 112 and/or processor 50.

Kiosk 106 comprises:
a) at least one Input/Output ("I/O") device 107, such as a screen and/or a keyboard. I/O device 107 displays information to the user, such as identification of the selected compartment 114 which will receive the user's articles. I/O device 107 is also configured to receive input from the user, such as the user's account information and the number of the bundles of articles, such as article-filled bags, that the user wishes to deposit;
b) a printer 109 to generate individually encoded bag labels 523 for the user to manually attach to bags 20, and optionally a printout or receipt for the user and other information;
c) circuitry that is in electronic communication with flaps 112 and other components of repository 102 and processor 50;
d) a kiosk digital information processor 115, the functions and operation of which are described below;
e) a power source or a connection to an external power source such as grid power and/or solar panels 108, for providing the power necessary for the repository 100 to operate.

Figure 8:
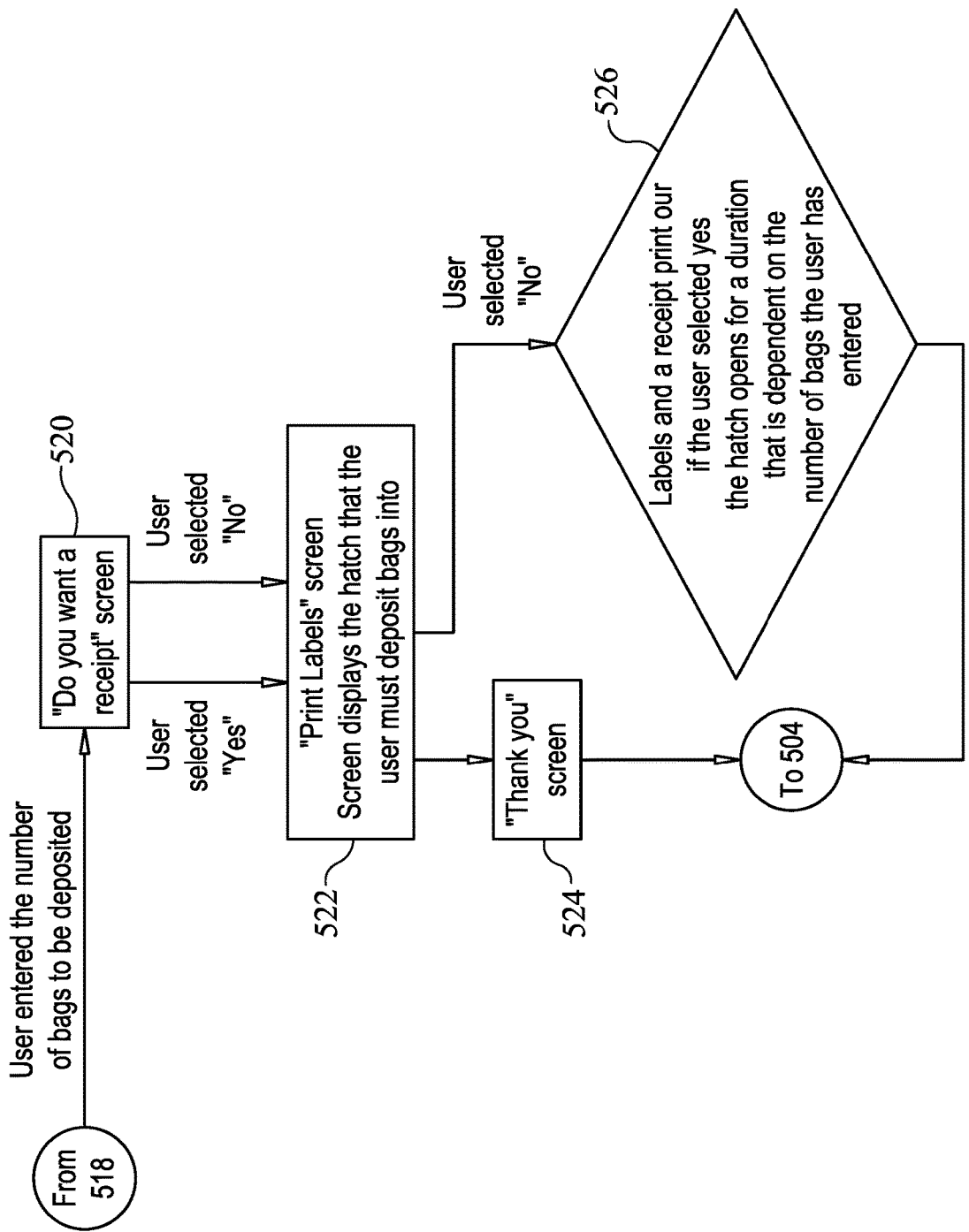
FIGS. 8 and 9 provide a block diagram showing a method of operation according to an embodiment of the system.

Operation of the present system 10 will now be described by reference to FIGS. 7-9.

Figure 6:
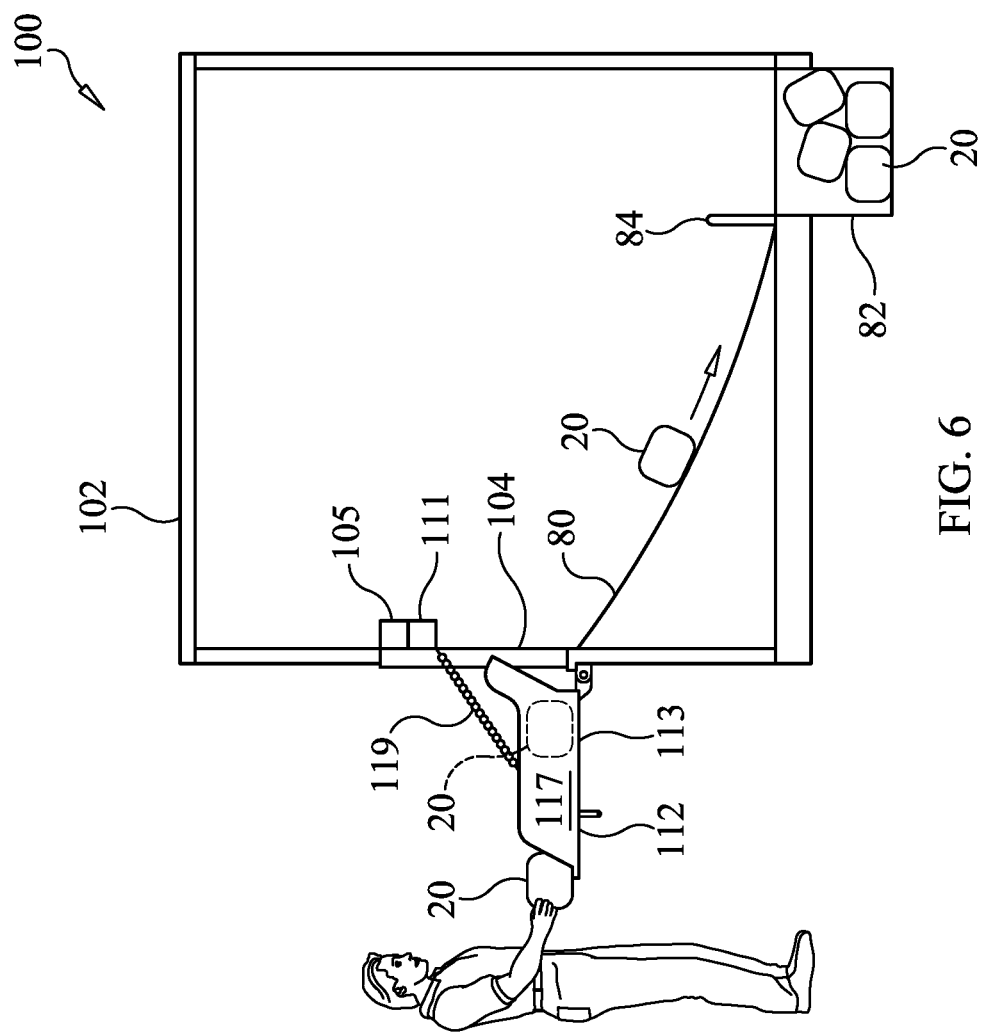
FIG. 6 is a cross-sectional view of the repository along line 5-5 of FIG. 2, showing the hatch cover in an open position.

Kiosk processor 115 monitors the capacity status of each compartment 114, such as the available capacity of each compartment 114 to receive additional articles within the corresponding bin 82 or alternatively if the bin 82 is full and awaiting emptying. The term "capacity status" refers to the percentage by which a bin 82 is filled with containers. For example, bin 82 in FIG. 6 is shown at near full capacity. Typically, a level of 100% capacity is considered to be reached when further articles would tend to overflow bin 82 during handling and transport. This capacity level may be somewhat below the level at which articles overflow a stationary compartment. The capacity status may be monitored by tabulating the total numbers of bags 20 that users indicate they are depositing within each compartment. This numerical information is integrated with the average volume of such bags 20 based on an estimate, to determine a total volume by which each compartment has been filled. For example, the estimated average bag volume may be based on past experience and adjusted by the operator on a periodic basis. This capacity status level is then compared with the maximum capacity as pre-determined above, to determine the remaining capacity of each bin. The estimate of average bag volume can be obtained by experience with using the system, and may be revised over time as system usage experience is gained. Alternatively or in additional, other means may be provided to monitor the capacity status of each compartment. Such means include any means known to the art to provide this function. This includes adapting a conventional optical or light emitting/detecting system to measure the level by which each compartment has been filled and/or to physically detect bags being deposited into each compartment and to transmit such information to kiosk processor 115 whereby the capacity status of each compartment 114 is determined.

In response to the capacity status of each compartment 114 and in response to the input from I/O device 107, such as an input of the number of bags that a user is to deposit into the repository 100, kiosk processor 115 determines which compartment or compartments has the capacity to receive the bags that a given user wishes to deposit. Processor 115 then performs several steps: first, the user is notified by the kiosk display as to which compartment or compartments stand ready to receive the bags 20. If the user is directed to deposit bags in more than one compartment, he is informed of the number of bags to deposit in the respective compartments. However, it is preferred to configure the system whereby the user is only directed to a single compartment unless there is no other option. The second function performed by processor 50 is to actuate unlocking of the flap(s) 112 associated with the selected compartment(s). For this purpose, processor 115 transmits a signal over the circuitry to a specific one or ones of locks 105, to actuate unlocking of one or more selected flaps 112 so that a user may open that flap or flaps to deposit his bag(s). If system 10 includes the optional actuators 111, the selected flaps 112 are automatically opened in response to signals from processor 115.

After a predetermined period or after the user has closed flap 112, the processor 115 may send one or more signals over the circuitry, to lock 105 to lock the flap 112, and/or to actuator 111 to close the open flap 112. Lock 105 is configured such that when in the locked position, closing of the flap automatically actuates lock 105 to lock flap 112. However, in the unlocked position, the flap is unlocked such that it can be reopened if it has been inadvertently closed.

Central processor 50 may communicate with kiosk processor 115 and each compartment 114 of the repository 100, including the lock/actuator of the flap 112 of the compartment 114 via a wired or wireless direct network connection or over the Internet.

Central processor 50 may perform some or all of the functions of kiosk processor 115 as set out above. For example, central processor 50 may monitor the capacity status of each compartment and receiving input information from a user via the I/O device 107 of the kiosk 106. In another example, central processor 50 may lock or unlock the flap 112 of a selected compartment 114 based on the capacity status of that compartment and the input information received from the I/O device 107.

Central processor 50 receives information from kiosk processor 115 regarding the capacity status of each compartment 114. The information may be received by email or other signal transmission means. This received information is displayed to an administrator, for example, on a website.

Optionally, kiosk 106 includes an information reader that detects and reads data from an information carrier such as a "smart card" that is unique to each user and which may be used by the user to activate the system.

Solar panels 108 are mounted on the roof of structure 102 and are oriented to generate solar power to energize the repository 100. Surplus electricity is stored in conventional deep cycle batteries. If the stored power in the batteries drops below a pre-set level, an automatic transfer switch will switch the power source mode to grid-tie mode. Meanwhile, solar panels 108 may continue to charge the batteries. Once the batteries are charged to a pre-set level, the power source will be switched to the solar supply mode.

Method of Depositing Recyclable Materials a. Establishing a User Account

A prospective user of system 10 initially establishes a user account. This step is performed at kiosk 106 or remotely, for example via a website. The user contacts a recycle service provider to set up a user account. After a unique user account is established in the database of system 10, the user is assigned an account number, such as a phone number associated with the user. The user establishes a unique login code (typically a PIN and/or password) to log into his account. The user can enter personal information such as name, address, email address and optionally other information unique to the user, and optionally financial information to allow direct money transfer to the user's account. Normally, all legally-required and prudent requirements are met regarding the privacy of the user's information as well as obtaining any appropriate consents from the user. By associating an account with the unique information of a user, the system 10 can uniquely identify the user with the account and the login code.

b. Depositing Recyclable Materials

A user periodically deposits recyclable articles such as cans or bottles at repository 100. The user normally places the articles into a bundled form as bags 20. The bags may be filled on-site or in advance. Preferably, the bundles are of a standard, uniform size, for example plastic bags of a selected volume. It is evident that not all users will fill the bags to capacity. However, the system accommodates sufficient numbers of bundles whereby the average volume of the bundles will tend to remain reasonably constant and predictable.

The user then operates the repository 100 by interacting with I/O device 107 of kiosk 106.

Referring to FIG. 7, the user is initially authenticated by the system by entering login credentials at kiosk 106. In an example, the user first enters an account number, user name or personal identification number ("PIN") (step 502). The access code may be the last three numbers of a previous invoice that has not expired, a personal identification number (PIN) that has been assigned to the user, a number generated previously by the user, or, in the case of authorized users, an administrator account number. Alternatively or in addition, the user inserts an information carrier such as a "smart card" (i.e. a card having an electronically-readable information carrier) into kiosk 106 and enters a pre-set PIN number.

If the user elects to enter a PIN, a screen is then displayed to the user and requests a PIN entry from the user (step 510). The user enters his PIN. The system then compares that PIN with the pre-set PIN in a database stored in the system, which associates each PIN with a user. If a match is found, the system can identify the user by the entered PIN. After the user has been identified by the system 10, the user may optionally be required to enter further identifying information to log in. Once logged in, the user may check the balance of his account or other account information (step 512). If the system cannot find a user associated with the entered PIN, the user is redirected to the screen at step 502.

From step 512, if the user selects "Check Balance", the screen will display the user's monetary balance generated by previous deposit refunds. If the user wishes to deposit recyclable articles, he selects "Deposit Bags". The screen will require the user to enter the number of the bags to be deposited (step 518). After the user enters the number of the bags, he may have an option to receive a receipt (step 520). For example, the screen may display "Do you want a receipt?" The user may elect to print out the receipt or have it stored in his account and/or delivered to the user electronically by email, text message or other electronic delivery means that the user enters either at the kiosk 106 or which has been previously linked to the user's account.

Kiosk 106 then generates bag labels 523 in response to the number of bags entered by the user (step 522), one label per bag 20. The labels 523 may be generated automatically after the user enters the number of bags or in response to a prompt entered by the user. Step 522 may be performed independently of step 520 or sequentially.

Kiosk 106 then generates and dispenses one or more unique, machine-readable labels 523 for each bag 20. For example, the labels may comprise a bar-code printed onto adhesive-backed paper, which the user can apply onto each bag 20. The empty bags themselves may be available at kiosk 106, either dispensed individually in response to the user's input or available from a dispenser in an uncontrolled fashion. The means by which kiosk 106 generates uniquely-coded labels 523 and dispenses these to the user are adapted from means known to the art for this purpose. The user is also instructed to apply labels 523 to the bags; this permits the deposit value of the recyclable articles within the bag to be attributed to the user's account, after such articles are counted and tabulated at a central recycling facility at a later stage.

Kiosk 106 informs the user as which specific hatch 104 the user should use to deposit the bags (step 504). This information may be displayed on screen 107 of kiosk 106 or alternatively or in addition printed on the bag labels 523 or otherwise communicated to the user. In some cases, users may be instructed to deposit some of bags 20 into one hatch 104 and others of bags 20 into another hatch 104. However, as stated above, it is preferred that the user need only operate a single hatch, and a direction to deposit bags through multiple hatches may be reserved for cases in which there is no other option due to the capacity status of the compartments and the number of bags presented by the user.

Where assistance from an operator is needed, a user can contact an operator, for example, by calling the office or otherwise initiating communications with the operator, to report the malfunction of the repository.

The selection of a specific hatch 104 for a given user is determined by the processor of kiosk 106 and/or central processor 50, based on the processor's determination as to which compartment 114 has capacity to receive the user's bags. Normally, repository 100 is configured whereby the bins 82 of respective ones of compartments 114 are sequentially filled to a predetermined capacity. For example, users may initially be directed to the first-in-line hatch 104 until the processor(s) determines that sufficient numbers of bags 20 have been deposited to fill that first compartment 114. At that point, subsequent users are directed to deposit bags into the next-in-line hatch 104, and so forth. The sequence of compartments 114 to which users are directed need not be in linear order. As well, in some cases processor(s) may be configured to only partially fill one or more compartments before directing users to a different compartment. A user may be directed to deposit his bags in multiple compartments 114, or the system may be configured to be more convenient to the user whereby any given user is directed to deposit bags in only a single compartment 114. In this latter configuration, the system may be configured whereby the multiple compartments 114 can be filled in tandem by sequential users, based on the numbers of bags being deposited by such users. For example, if compartment 1 is close to capacity but can accept one more bag, a user having multiple bags may be directed to compartment 2. A subsequent user having only a single bag may be directed to compartment 1, thereby ensuring that each compartment is filled to capacity but any given user need only access a single compartment. In a similar fashion, if one compartment has capacity for only two bags, a user having more than two bags to deposit may be directed to a next-in-line compartment while a subsequent user with one or two bags may be directed to the compartment which has capacity to receive those bags.

The capacity of compartments 114 to receive additional bags 20 can be determined by various means. For example, this can be determined from past experience based on the average volume of bags deposited by past users. This approach is more accurate when bag size is standardized. A margin of error may be built in to prevent over-filling.

In an embodiment, each of the compartments 114 may include a counter, implemented by software, to record the number of bags received in a specific compartment 114. The counter is reset to zero when the compartments 114 are emptied. The counter tabulates and totals the number of bags which are indicated by users as being deposited within each compartment. The information of the counter can be accessed by kiosk processor 115 or central processor 50.

Alternatively or in addition, sensors 118 associated with each hatch 104 can detect the numbers and optionally size and/or weight of each bag 20 deposited therein and relay this information to the processor(s), to thereby allow a determination as to whether the respective compartments are at or close to capacity. Alternatively or in addition, sensors 118 may detect the volume and/or weight of bags once these have been deposited within the compartments.

Once the user has been informed as to which hatch(es) 104 will receive the user's bags, the respective flap 112 of each such hatch 104 is unlocked and/or automatically opened for a predetermined duration by a corresponding actuator 111 (step 508). This duration is selected as a reasonable time to allow a user to deposit the bags into the hatch. The user can optionally be informed of the duration and/or the time remaining for the "flap open" status. Alternatively, system 10 may comprise a remotely-controlled lock 105 rather than an actuator, which permits manual operation of flaps 112 rather than automated opening and closing. In that case, the identified hatch 104 can be remotely unlocked by processor(s) 115 or 50 and then manually opened by the user for a predetermined duration. In this aspect, flaps 112 can then be shut by an actuator or a gravity or spring-driven retractor and locked after the selected duration. Locking of hatch 104 may be triggered automatically by closing of the hatch or actuated remotely by the processor(s) to allow a user to re-open the flap if inadvertently closed before all bags are deposited.

When the identified flap 112 is opened, the user can then insert the labelled bags 20 into the respective hatch 104 for depositing into the corresponding compartment 114 (step 530).

If the user has not deposited all of the bags 20 into the designated compartment 114 within the pre-determined duration and the flap 112 is locked, the user can be re-authenticated and enter the number of bags to be deposited. Kiosk processor 115 determines one or more hatches 104 for the user to deposit the bags and unlocks the corresponding flap(s) 112 of the selected hatch(es) 104. This determination is made based upon the capacity status of the respective compartments 114 and the number of bags entered by the user at kiosk 106.

After the user has deposited all of his intended bags 20, the user closes the flaps 112 or these are automatically closed by actuator 111. Flaps 112 are locked after closing by actuation of lock 105. The locking function performed by lock 105 may act in place of or in addition to the closing function performed by actuator 111.

Once a repository 100 has reached a pre-determined capacity of bags 84, the system will send an electronic notification to central processor 50. Normally, the system would be configured to send such a notification when repository 100 is filled to a predetermined percentage of its full capacity, to accommodate additional users during the delay before servicing can be performed and/or to provide a margin or error to accommodate bags of varying degrees of fullness. The percentage selected may depend on factors such as the amount of use experienced by the particular repository and the average time required to service the repository to empty the filled compartments and transport the filled bags 20 to a central processing facility.

If all compartments 114 of repository 100 become filled to capacity before the system is serviced, kiosk 106 may signal to users that the system is full and no further bags may be deposited. The central processor 50 and/or kiosk processor 115 maintains status information of compartments 114. For example, central processor 50 and/or kiosk processor 115 tabulates the number of the bags received by each hatch. Once the particular hatch has reached its capacity level, central processor 50 and/or kiosk processor 115 will keep the hatch locked and make it unavailable for receiving additional bags 20.

Once repository 100 has been emptied, the operator/administrator may reset the number of the bags in repository 100 to zero and all the hatches 104 will be made available again to the users. If a counter is used, the counter will be reset as zero when the operator/administrator reset the number of the bags in the repository 100 to zero.

The premises may be monitored, such as by remote security devices such as security cameras, to monitor unauthorized activities. Security devices may be operatively linked to central processor 50 to centrally monitor security throughout system 10.

After the bags are transported to the central processing facility, the tags are scanned to identify the customer associated with each particular bag. The articles within the bags 20 are then sorted and the deposit values entered into central processor 50. The deposit value for each customer is then entered into his account. Optionally, a notification such as an email may be automatically sent to the user, notifying the user of the amount that has been deposited in his account. The notification may also provide details of the recyclable materials, such as quantity of individual articles, categorized by type and/or dollar refund value, contained in each bag 20 and in total.

c. Configuring the System

Figure 9:
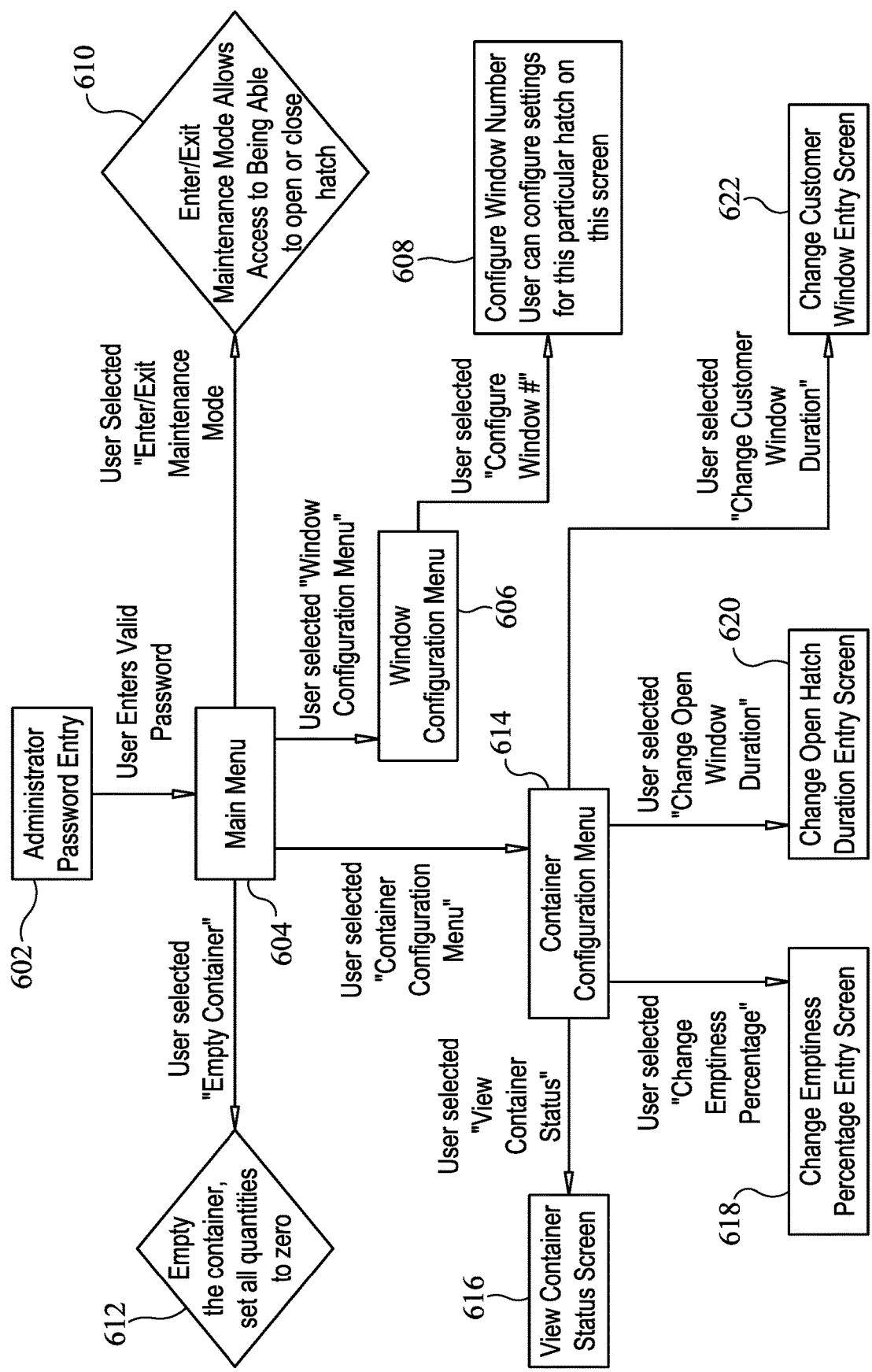

Referring to FIG. 9, if an operator enters an administrator account number, an administrator password entry is displayed on the screen (step 602). A main menu is displayed on the screen (step 604) and various administrative steps can then be performed (step 528). The operator can then select one of the four options, namely, "Window configuration menu", "Enter/Exit Maintenance Mode", "Empty Container", and "Container Configuration Menu".

If the user selects "Window Configuration Menu", a screen will promote the "Window Configuration Menu" (step 606). The menu allows the user to select a winder to configure. In particular, the user can configure settings for the selected window (step 608). The settings that can be configured include: 1) duration of the time for which a hatch will stay unlocked; 2) keeping a particular hatch locked and unavailable for receiving bags when the hatch is full or malfunctioning and 3) locking/unlocking a hatch.

If the operator selects "Enter/Exit Maintenance Mode" (step 610), he may access a selected individual repository 100 to open or close the flaps of that repository. This can be used, for example, to override the automated control of the repository and manually control the repository by the operator in the event of a malfunction.

If the operator selects "Empty Container", the container will be emptied and the quantities of the bags will be rest to zero.

If the operator selects "Container Configuration Menu", the "Container Configuration Menu" will be shown on the screen (step 614). With this menu, the user has four options, namely, "View Container Status", "Change Emptiness Percentage", "Change Open Window Duration", and "Change Customer Window Duration".

If the operator selects "View Container Status", the screen displays the status of the containers/compartments 114 (step 618). The status of compartments includes total number of bags received in a repository 100, number of bags deposited per hatch 104, any hatches that are malfunctioning, etc.

If the operator selects "Change Emptiness Percentage", the screen displays the current emptiness percentage for each of the containers. This "Emptiness Percentage" parameter is used to trigger notification to an operator that a hatch 104 has reached the defined emptiness percentage. For example, if this parameter is set as 20%, when the compartment 114 is 80% fully, a notification, such as an email or a message, can be sent from the processor of the kiosk 106 to the central processor 50. The operator then knows that the compartment need to be emptied out soon. The user may change this parameter to based on the speed of deposit. If the compartment 114 is filled faster than anticipated, the emptiness percentage may be adjusted to a larger number, for example 30%. If the compartment 114 is filled slower than anticipated, the emptiness percentage may be adjusted to a smaller number, such as 10%.

If the operator selects "Change Open Window Duration", the screen displays the current setting of the "Open Window Duration". The user may change this parameter to any suitable duration.

If the operator selects the "Change Customer Window Duration", the screen will show the current setting of the "Customer Window Duration". For example, the "Customer Window Duration" may be 3 minutes per user for depositing 10 bags. The duration generally is proportion to the bags to be deposited. If there are five bags to be deposited, the duration may be 1.5 minutes. If 3 minutes proves to be insufficient for some users to deposit 10 bags, then this duration can be increased. The duration can also be decreased if appropriate.

The present invention has been described herein by reference to specific embodiments. However, the scope of the present invention is not limited to such embodiments nor specific aspects thereof. Rather, the scope of the invention is to be understood from the specification as a whole including the claims.

The invention claimed is:

1. A system for returning recyclable articles to obtain a deposit refund comprising:
   a) a structure open internally and divided into multiple storage compartments that are not separated by physical barriers and that are configured to temporarily store the articles, said structure comprising a hatch for each storage compartment, each hatch being open to the exterior of the structure and configured to permit the articles to be deposited into the respective compartment, hatch covers for independently closing each of the hatches, a slide inside each compartment to guide the deposited articles from the hatch downwardly and to a rear of the compartment, the structure comprising a door at one side to allow an operator to enter the structure to retrieve the recyclable articles, and a plurality of actuators for independently closing and unlocking the covers by remote actuation;
   b) a user interface for receiving input from a user and displaying information to the user, wherein the user input includes user identification information and the quantity of articles or bundles of articles which the user intends to deposit, and the displayed information includes identification of a selected one or ones of the compartments into which the user can deposit the articles;
   c) a controller in electronic communication with the user interface and the actuators, wherein the controller is configured to determine the capacity status of said compartments based on information entered by previous users at the user interface about the number of the articles or the bundles of articles that the previous users have deposited, to determine which compartment has capacity to receive the quantity of the articles identified by the user based on said capacity status, and to control selected ones of the actuators associated with corresponding ones of the compartments for opening and closing of the hatch covers associated with the selected ones of the compartments;
   d) a printer to generate an individually encoded label for the user to attach to the recyclable articles, the label associating the user with the recyclable articles; and
   e) a central processor locatable remotely from the structure, the central processor configured to receive a deposit value equating with the deposit value of the returned recyclable articles, and enter the deposit value in a user's account.

2. The system of claim 1, further comprising a user-accessible kiosk comprising the user interface and controller.

3. The system of claim 1, the central processor being in communication with the controller, and configured to tabulate the capacity status of the compartments.

4. The system of claim 1, wherein the structure is configured to receive the articles in bundled form and the user interface comprises a user input configured to permit the user to identify a number of bundles which the user intends to deposit at the repository.

5. The system of claim 4, wherein the number of compartments for receiving the articles is the least number of compartments required to receive the bundles of the given user without exceeding the capacity status of any compartment.

6. The system of claim 4, further comprising at least one counter for recording the number of bundles deposited into said compartments.

7. The system of claim 1, further comprising at least one sensor for detecting available space within a compartment for receiving additional articles.

8. The system of claim 1, wherein the compartments comprise removable bins for receiving the articles.

9. The system of claim 1, wherein the actuators are configured for opening and closing the covers in response to signals from the controller.

10. The system of claim 1, wherein the actuators are configured to control locks associated with the hatch covers.

11. A kiosk for controlling a system for returning recyclable articles to obtain a deposit refund, wherein the system comprises a structure open internally and divided into multiple storage compartments that are not separated by physical barriers and that are configured to temporarily store the articles, said structure comprising a hatch for each storage compartment, each hatch being open to the exterior of the structure and configured to permit the articles to be deposited into the respective compartment, hatch covers for independently closing each of the hatches, a slide inside each compartment to guide the deposited articles from the hatch downwardly and to a rear of the compartment, a door at one side of the structure to allow an operator to enter the structure to retrieve the bundled recyclable articles, and a plurality of actuators for independently locking the covers by remote actuation; the kiosk comprising:
 a) a user interface for receiving input from a user and displaying information to the user, wherein the user input includes user identification information and the quantity of articles or bundles of articles which the user intends to deposit, and the displayed information includes identification of a selected one or ones of the compartments into which the user can deposit the articles;
 b) a controller in electronic communication with the user interface and the actuators, wherein the controller is configured to determine the capacity status of said compartments based on information entered by previous users at the user interface about the number of the articles or the bundles of articles that the previous users have deposited, to determine which compartment has capacity to receive articles from the user based on said capacity status, and to control selected ones of the actuators associated with corresponding ones of the compartments for opening and closing of the hatch covers associated with the selected ones of the compartments; and
 c) a printer to generate an individually encoded label for the user to attach to the recyclable articles, the label associating the user with the recyclable articles.

12. The kiosk of claim 11, wherein the number of compartments for receiving the articles is the least number of compartments required to receive the bundles without exceeding the capacity status of any compartment.

13. A method of collecting bundled recyclable articles from a user at an unmanned repository and providing a deposit refund to the user, said repository comprising a structure open internally and divided into multiple storage compartments that are not separated by physical barriers, each storage compartment being accessible by a corresponding hatch, hatch covers for independently closing each of the hatches, a slide inside each compartment to guide the deposited articles from the hatch downwardly and to a rear of the compartment, a door at one side of the structure to allow an operator to enter the structure to retrieve the bundled recyclable articles, and a plurality of actuators for independently locking each hatch cover by remote actuation, said method comprising the steps of:
 a) identifying the user;
 b) receiving information indicating the number of article-filled bundles that the user proposes to deposit at the repository;
 c) generating an individually encoded label at the repository for each of the bundles to be deposited, wherein the label uniquely identifies the user and the bundle;
 d) determining the capacity status of the compartments to receive additional articles from users based on information entered by previous users at a user interface associated with the repository about the quantity of the bundles of recyclable articles that the previous users have deposited, and selecting which compartment for the user to deposit their bundle;
 e) actuating one or more specific hatch covers to open one or more hatches to permit the user to access one or more selected compartments for depositing each bundle;
 f) guiding each bundle along the slide downwardly and to the rear of the respective compartment;
 g) closing the one or more hatch covers after a predetermined duration;
 h) entering the structure through the door to retrieve the bundled recyclable articles;
 i) arranging transport of the bundled recyclable articles to a central processing facility;
 j) scanning the label on each bundle at the central processing facility to relate the articles with the user; and
 k) entering the deposit value for the articles to a user's account.

14. The method of claim 13, further comprising generating a notification to an administrator when the compartments reach a predetermined capacity status.

15. The method of claim 13, comprising the further step of generating a visual display to the user indicative of the compartments that are actuated and the number of bundles the user should deposit in each of said compartments.

16. The method of claim 13, wherein the steps a to c are performed at a user-accessible kiosk comprising the user interface and controller.

17. The method of claim 13, further comprising the step of communicating with a central processor locatable remotely from the structure to tabulate the capacity status of the compartments.

18. The method of claim 13, wherein the number of compartments for receiving the articles is the least number of compartments required to receive the bundles without exceeding the capacity status of any compartment.

19. The method of claim 13, wherein said step e comprises actuating locks associated with the hatch covers.

20. The method of claim 13, wherein said pre-determined duration is determined from the numbers of bundles being deposited by the user.

* * * * *